United States Patent
Cemic et al.

(10) Patent No.: US 6,879,440 B2
(45) Date of Patent: Apr. 12, 2005

(54) AUTOFOCUS MODULE AND METHOD FOR A MICROSCOPE-BASED SYSTEM

(75) Inventors: Franz Cemic, Weilmuenster (DE); Lambert Danner, Wetzlar-Naunheim (DE); Robert Mainberger, Braunfels (DE); Michael Veith, Wetzlar (DE); Martin Osterfeld, Schlaitdorf (DE); Uwe Graf, Solms (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 89 days.

(21) Appl. No.: 10/355,868

(22) Filed: Jan. 31, 2003

(65) Prior Publication Data

US 2003/0147134 A1 Aug. 7, 2003

(30) Foreign Application Priority Data

Feb. 2, 2002 (DE) .......................................... 102 04 367

(51) Int. Cl.[7] .............................................. G02B 21/06
(52) U.S. Cl. ...................... 359/385; 359/389; 250/201.3
(58) Field of Search ................................ 359/368, 391, 359/392, 385, 389; 250/201.2, 201.3

(56) References Cited

U.S. PATENT DOCUMENTS

| | | | |
|---|---|---|---|
| 4,595,829 A | 6/1986 | Neümann et al. | 250/201 |
| 4,661,692 A | 4/1987 | Kawasaki | 250/201 |
| 4,734,570 A | 3/1988 | Horikawa et al. | 250/201 |
| 5,270,527 A | 12/1993 | Salzmann | 250/201.3 |
| 5,317,142 A * | 5/1994 | Noda et al. | 250/201.4 |
| 5,530,237 A | 6/1996 | Sato et al. | 250/201.4 |
| 5,963,366 A * | 10/1999 | Nakamura et al. | 359/389 |

FOREIGN PATENT DOCUMENTS

| | | |
|---|---|---|
| DE | 3219503 | 12/1983 |
| DE | 3328821 | 2/1985 |
| DE | 3446727 | 7/1986 |
| DE | 4133788 | 4/1993 |
| DE | 10024685 | 11/2001 |
| EP | 0124241 | 11/1984 |
| EP | 0953859 | 11/1999 |
| JP | 05045573 | 2/1993 |
| JP | 2001242375 | 9/2001 |

* cited by examiner

Primary Examiner—Mark A. Robinson
Assistant Examiner—Alessandro Amari
(74) Attorney, Agent, or Firm—Davidson, Davidson & Kappel, LLC

(57) ABSTRACT

An autofocus module for a microscope-based system includes at least two light sources, each of which generates a light beam for focusing. An optical directing device is provided that directs a respective portion of each light beam onto an incoupling means, which couples each of the light beams into the illuminating light beam of the microscope-based system and directs the light beams onto a specimen. A first and a second detector receive the light beams of the first and second light source reflected from the surface of the specimen, and ascertain the intensities on the first and second detector in time-multiplexed fashion.

26 Claims, 8 Drawing Sheets

AUTOFOCUS MODULE AND METHOD FOR A MICROSCOPE-BASED SYSTEM

CROSS REFERENCE TO RELATED APPLICATIONS

This application claims priority to German patent application 102 04 367.1, which is hereby incorporated by reference herein.

BACKGROUND

The invention concerns an autofocus module for a microscope-based system having an objective that defines an optical axis in which an illuminating light beam, which is perpendicular to a surface of a specimen onto which focusing occurs, propagates.

The invention further concerns a microscope system having an objective that defines an optical axis which is perpendicular to the surface of a specimen, and having a stage on which the specimen rests and which is displaceable in the direction of the optical axis.

In addition, the invention concerns an autofocus method for a microscope-based system which encompasses at least one objective that defines an optical axis of the microscope-based system.

German patent document DE 32 19 503 describes an apparatus for automatic focusing on specimens to be viewed in optical devices. After reflection at the surface of a specimen and reflection at a splitter mirror, the reflected measured light beam passes through a pinhole. A portion of the measured light beam is reflected out by means of a fully reflective surface and, after passing through a slit diaphragm, is directed onto a differential diode. In the focused state, the focus is located between the two diodes. Upon defocusing, the measurement spot migrates onto one of the two diodes, which are connected to corresponding control means. Optical or mechanical means of the microscope are adjusted by the control means to as to bring the measurement spot once again between the two diodes and thus re-establish the focal position.

European Patent Application EP-A-0 124 241 describes a microscope having an automatic focusing device. The microscope encompasses a storage device for saving the data for the objectives that are used in the microscope. Also provided is a control device that monitors and regulates the various microscope functions. The tasks of the control device also include moving the focusing stage. A CCD element, which receives an image from the respectively selected objective and, together with a calculation unit, ascertains the image sharpness from the optimum contrast, is provided as an image acquisition device. The objective data of the objective currently being used must be taken into account in ascertaining the optimum degree of sharpness. These data are, as already mentioned above, stored in a memory.

German Unexamined Application DE 41 33 788 describes a method for autofocusing of microscopes and an autofocus system for microscopes. The image of a specimen or of a pattern superimposed onto the specimen is conveyed to two regions on a detector or to two different detectors, such that in the focused position, one image occurs in front of one detector, and one image behind the other detector. The image sharpness states on the detectors are converted into electronic signals whose difference is used to focus the objective. The distances of the image or of the respective pattern from the respective detectors are adjustable. Deliberate offset settings as well as "IR offset" correction settings can be implemented.

In the context of automatic focusing in microscopes in the semiconductor industry, it is problematic that transitions from highly reflective regions to less-reflective regions cause an autofocus system to make incorrect settings. These transitions are referred to as "edges." The influence of these edges on focusing using an autofocus system is referred to in the description below as the "edge effect."

SUMMARY OF THE INVENTION

An object of the present invention is accordingly to provide an autofocus module for a microscope-based system that, irrespective of edge effects, ensures reliable focusing on a specimen to be examined.

According to an embodiment of the present invention
- at least two light sources are provided, each of which generates a light beam for focusing;
- an optical means is provided that directs a respective portion of each light beam onto an incoupling means which couples each of the light beams into the illuminating light beam of the microscope-based system and directs it onto the specimen; and
- at least a first and a second detector are provided, whereby respective light beams of said at least two light sources are reflected from the surface of said specimen and are directed onto said first and said second detector.

The present invention provides a microscope system that, irrespective of edge effects, ensures reliable focusing on a specimen to be examined.

The present invention provides a microscope system which is characterized in that there is connected to the microscope system an autofocus module that contains at least two light sources, each of which generates a light beam for focusing; that an optical means is provided that transfers a respective portion of each light beam into the optical axis of the microscope system and directs it onto the specimen; and that at least a first and a second detector are provided, each of which, via the optical means, directs a respective light beam of the first and second light source, reflected from the surface of the specimen to be examined, onto the first and the second detector.

It is an object of the present invention to provide an autofocus method for a microscope-based system that ascertains the optimum focal position rapidly and reliably and irrespective of edge effects.

The present invention provides an autofocus method including the following steps:
- displacing a specimen in the direction of the optical axis and around a region that contains the optimum focal position;
- generating, in each of at least two light sources, a light beam for focusing, the at least two light sources being operated alternately with one another;
- directing a portion of the first and the second light beam onto the surface of the specimen by means of an optical means;
- receiving on a first detector the light of the first light beam reflected from the surface of the specimen, and receiving on a second detector the light of the second light beam reflected from the surface of the specimen; and
- determining the optimum focal position from the measured intensities on the first and second detectors.

The use of at least two light sources, each of which emits a light beam for focusing, is advantageous because the use of two light beams restores the symmetry of the system that was lost by the use of only a portion of the light for focusing in each case. The two light sources each emit a light beam for focusing, these two light sources being operated alternately with one another. As a rule, alternating operation of the two light sources is determined, e.g., by their pulse duration. The result is that when the stage with the specimen is displaced along the optical axis, the focus moves on the surface of the specimen in two mutually opposite directions. The consequence of this is that information is obtained from two foci approximately simultaneously. During displacement of the specimen, intensities are ascertained alternately at the first and at the second detector, and the intensities thus ascertained are stored as intensity profiles in a memory of the control computer or compared to sample profiles from the memory for the optimum focal position.

The optical means is embodied as a prism, and arranged in such a way that the light of the first light source is directed into a first half of the illuminating light beam, and the light of the second light source into a second half of the illuminating light beam. The optical means can each be constructed from two mirror-coated elements, arranged at right angles to one another. The mirror-coated elements are inclined at a 45° angle to the respectively incident light beams for focusing.

It is advantageous if the first and the second light source, the first and the second detector, the optical means, and further beam deflection means are arranged in a housing that can be connected to the microscope-based system. Since it is important in terms of measurement accuracy for the first and second halves of the light beam for focusing each to be coupled in exactly halved fashion into the illuminating light beam of the microscope-based system, arrangement of the various optical components in a housing is important in order to prevent any misalignment of the device. Laser diodes that generate the light beam for focusing are used as light sources. In addition, the laser diodes can easily be operated in pulsed fashion.

The housing of the autofocus module can be connected to the microscope-based system via a flange. Microscope-based systems comprise a dichroic beam splitter that couples the respective light beam for focusing into the microscope-based system, and couples the light beam reflected from the surface of the specimen back into the autofocus module.

BRIEF DESCRIPTION OF THE DRAWINGS

The present invention is elaborated upon below based on exemplary embodiments, with reference to the drawings, in which.

DETAILED DESCRIPTION

Figure 1A:
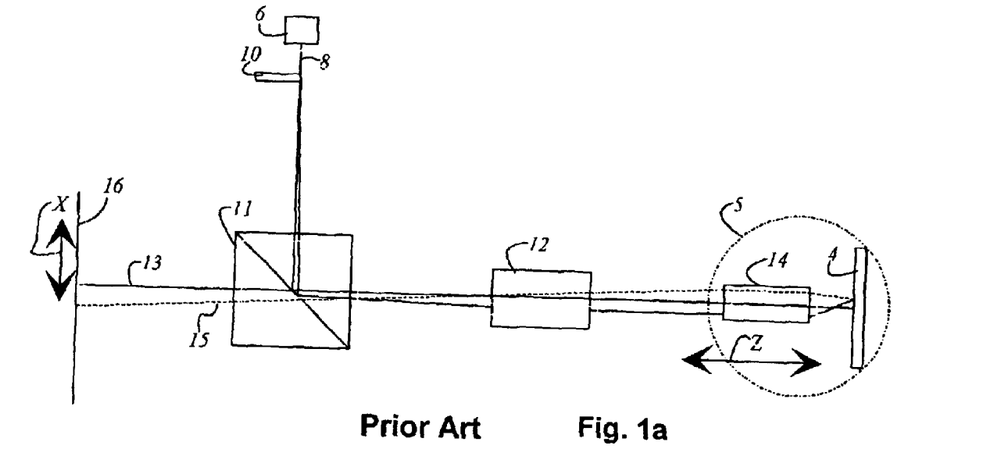
FIG. 1a depicts a prior art autofocus system in which the specimen is located below the focus.
Figure 1B:
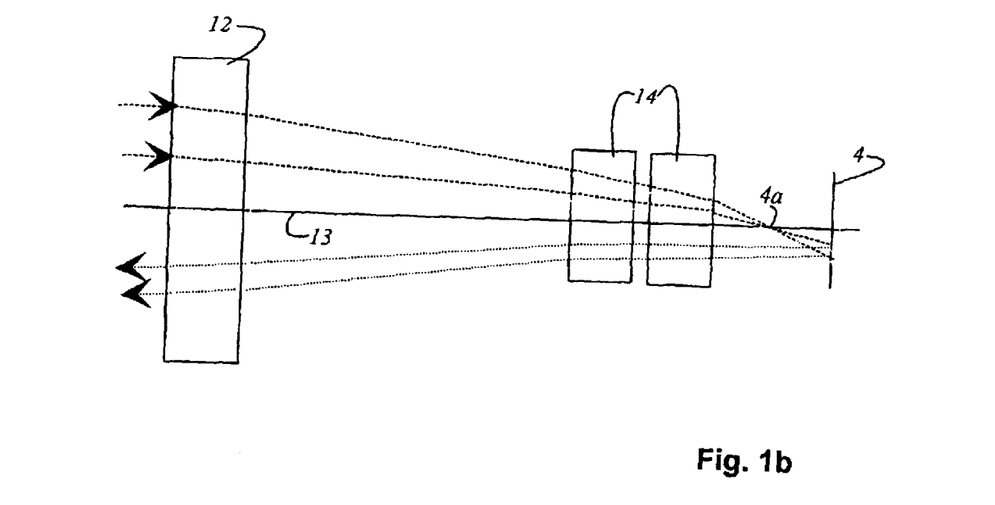
FIG. 1b is a detail view of the region marked with a dashed line in FIG. 1a, to illustrate the movement of the light spot on the specimen.

An autofocus system of the existing art is depicted in FIG. 1a, those parts of the microscope system not necessary for elucidation of the composition and manner of operation of the autofocus system being omitted. FIG. 1a describes the focal position in which a specimen 4 is located below focus 4a. The region around specimen 4 is marked in FIG. 1a with a dashed circle 5, and this region is depicted in detail in FIG. 1b; in FIGS. 1a and 1b, identical reference characters are used for identical features. A light source 6 emits a light beam 8 that is split by a pupil splitting system 10. Light source 6 can be embodied as a laser. Light beam 8 strikes a beam splitter 11 and is thereby coupled into optical axis 13 defined by a tube lens 12 and an objective 14. A reflected light beam 15 (or light beam bundle) emerges from specimen 4, which is located below focus 4a, undeflected by beam splitter 11. The deviation of reflected light beam 15 from optical axis 13 can be determined in an intermediate image plane 16. Specimen 4 lies on a stage (not depicted) that can be brought into a different focal position by displacement in Z direction Z. This modification of the focal position is converted into a change in X position X of reflected light beam 15 in intermediate image plane 16.

Figure 2A:
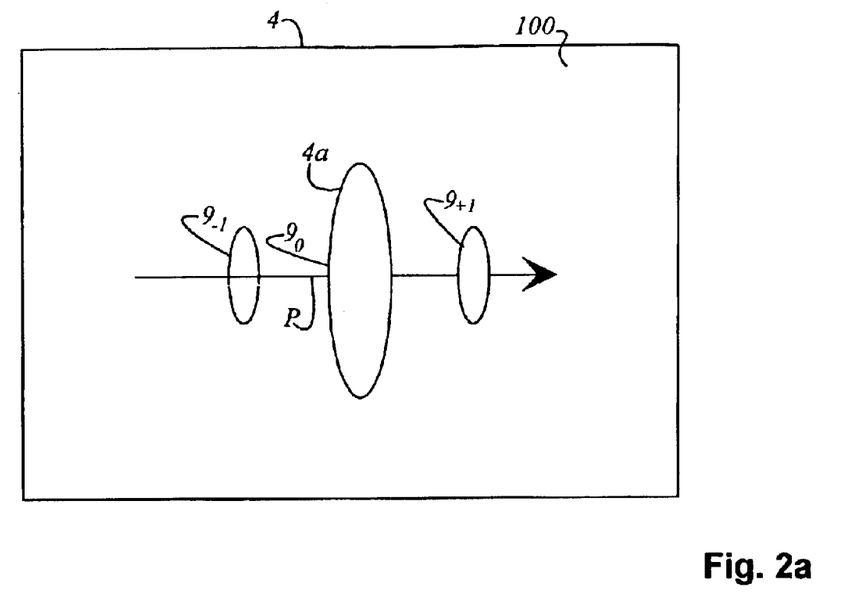
FIG. 2a shows an example of illumination of a microscopic preparation using the system of FIG. 1, no regions of differing reflectance being present on the preparation.
Figure 2B:
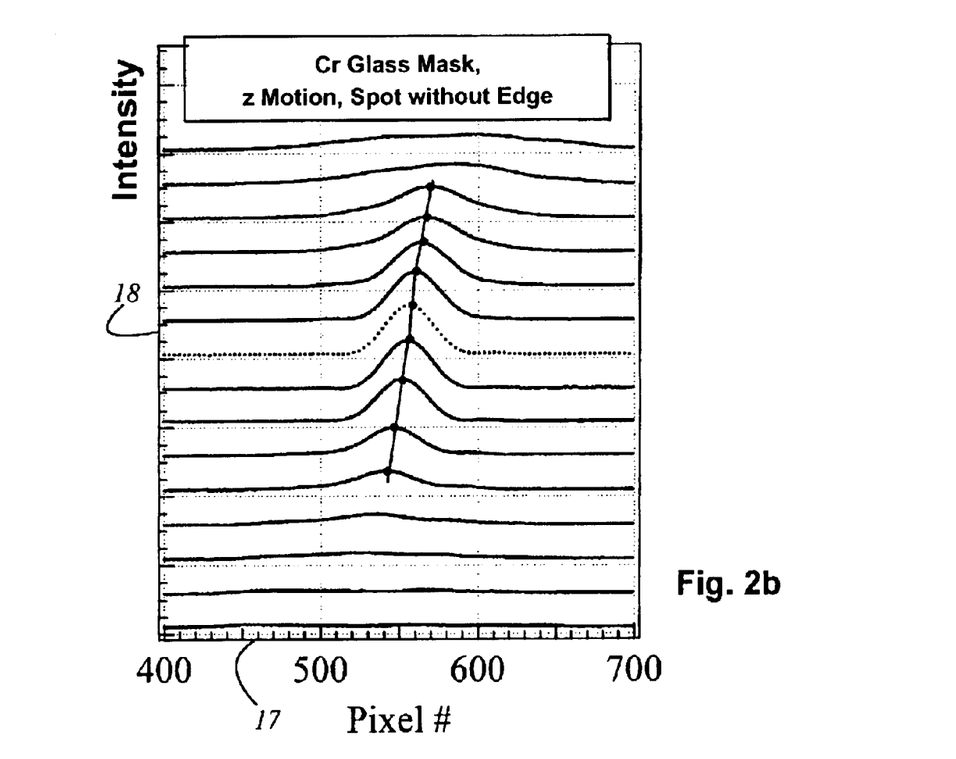
FIG. 2b depicts focus determination based on the intensity of the light reflected from the specimen and the migration of the center point of the intensities.

FIG. 2a shows the shape of a focus spot 4a on specimen 4. The direction of travel of focus spot 4a on specimen 4 is depicted by an arrow P. Focus spot 4a is constituted by zero-order focus spot $9_0$, a negative-first-order focus spot $9_{-1}$, and a positive-first-order focus spot $9_{+1}$. No regions having differing reflectances are present on specimen 4; only one high-reflectance region 100 is provided. In general, specimen 4 to be examined is arranged on a specimen stage. The optimum focal position is established by generating a relative motion between the specimen stage and objective 14 of the microscope-based system. This relative motion is performed over a small region around the optimum focal position. As a result of the relative motion, focus spot 4a moves over the surface of specimen 4 in the manner indicated by arrow P. In FIG. 2b, the intensity recorded in intermediate image plane 16 is plotted as a function of focal position. The pixel number of the individual photosensitive elements of the CCD element is plotted on abscissa 17 in FIG. 2b. The intensity of the light reflected from the surface of the sample is plotted, in arbitrary units, on ordinate 18. The curve that yields the optimum focal position is shown as a dashed line. In each curve, the center point of the intensity reflected from the surface of the specimen is depicted as a solid circle. If the focus setting is above or below the optimum focal position, it is clearly evident that the width of the intensity peak decreases as the optimum focal position is approached. The direction of motion of the center point is unequivocal, and in the case discussed here runs from left to right. The optimum focal position can thus be ascertained unequivocally from the center point profile and the shape of the intensity peak.

Figure 3A:
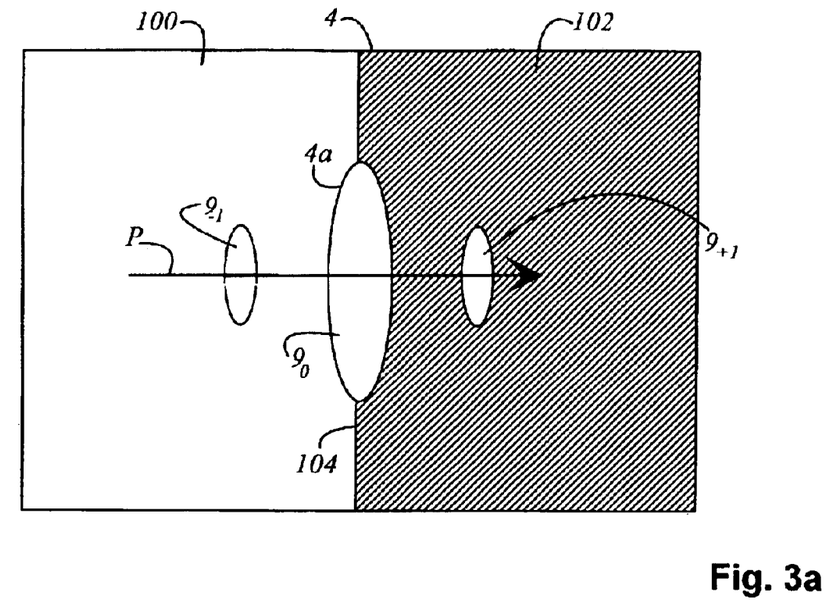
FIG. 3a shows an example of illumination of a microscopic preparation using the system of FIG. 1, the direction of travel of the focus spot being perpendicular to an edge on the preparation.
Figure 3B:
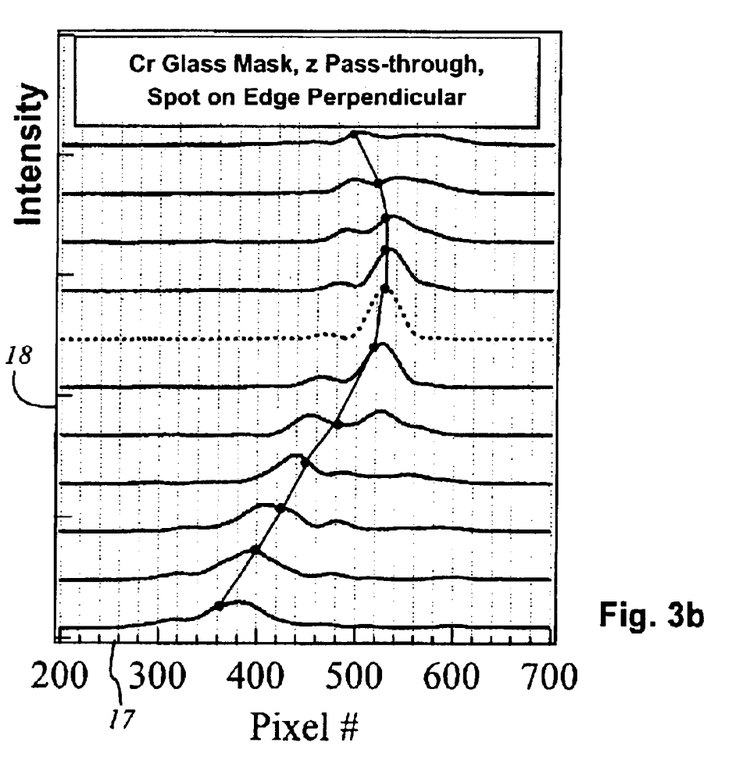
FIG. 3b depicts focus determination based on the intensity of the light reflected from the specimen and the migration of the center point of the intensities.

FIG. 3a shows the shape of a focus spot 4a on specimen 4. The direction of travel of focus spot 4a on specimen 4 is depicted by an arrow P. Focus spot 4a is constituted by zero-order focus spot $9_0$, a negative-first-order focus spot $9_{-1}$, and a positive-first-order focus spot $9_{+1}$. A high-reflectance region 100 and a low-reflectance region 102 are provided on specimen 4. The regions are separated by an edge 104 that, in this example, extends perpendicular to the direction of travel of focus spot 4a. As already mentioned in the description of FIG. 2a, the optimum focal position is established by means of a relative motion between the specimen stage and the objective of the microscope-based system. As a result of the relative motion, focus spot 4a moves over the surface of specimen 4 in the manner indicated by arrow P. At edge 104 the reflectance changes, thereby changing the light quantity reflected into intermediate image plane 16. The pixel number of the individual photosensitive elements of the CCD element is plotted on abscissa 17 in FIG. 3b. The intensity of the light reflected from the surface of the sample is plotted, in arbitrary units, on ordinate 18. The curve that yields the optimum focal position is shown as a dashed line. In each curve, the center point of the intensity reflected from the surface of the specimen is depicted as a solid circle. If the focus setting is above or below the optimum focal position, it is clearly evident that the symmetry of the intensity peak, and its height, increase as the optimum focal position is approached. The direction of motion of the center point runs initially from left to right, but reverses after the optimum focal position and runs from right to left. From the plurality of curves obtained, it is not possible to ascertain unequivocally the one for the optimum focus. Pairs of curves exist that have the same center point location but do not coincide with the optimum focal position. The determination of focal position is therefore not unequivocal in the case of an edge 104 perpendicular to the direction of travel of the focus spot.

Figure 4A:
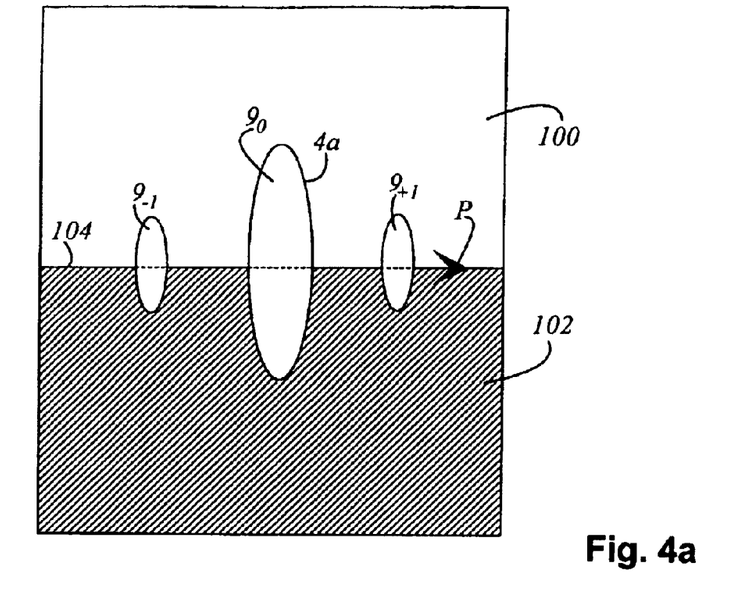
FIG. 4a shows an example of illumination of a microscopic preparation using the system of FIG. 1, the direction of travel of the focus spot being parallel to an edge on the preparation.
Figure 4B:
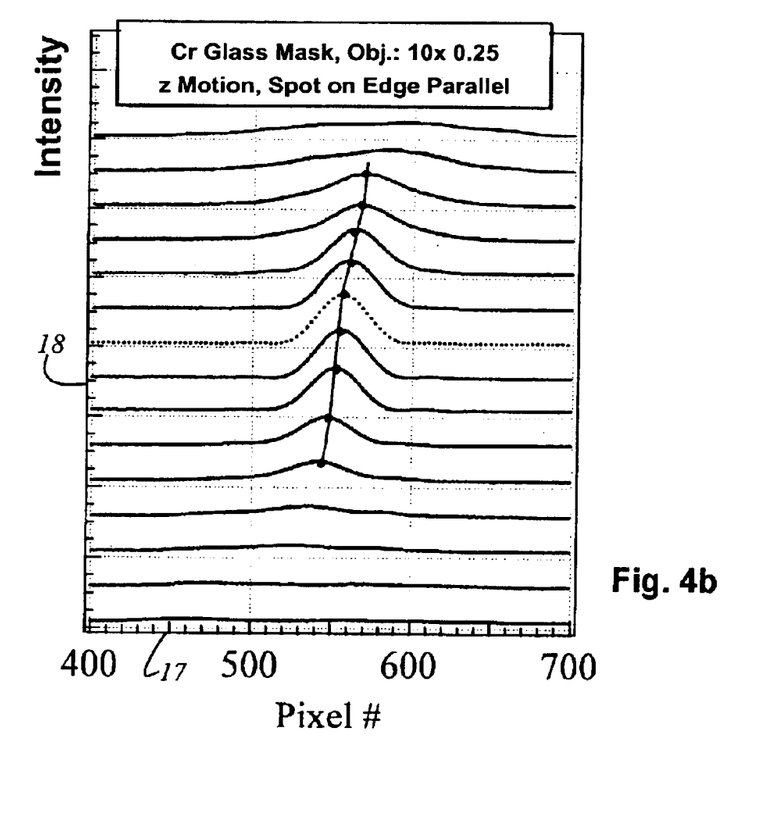
FIG. 4b depicts focus determination based on the intensity of the light reflected from the specimen and the migration of the center point of the intensities.

FIG. 4a shows the case in which focus spot 4a moves parallel to edge 104, which is defined by the boundary between a high-reflectance region 100 and a low-reflectance region 102. The direction of travel of focus spot 4a on specimen 4 is again indicated by arrow P. The focus spot moves along edge 104 during focusing, so that the light quantity reflected into the intermediate image plane changes. In FIG. 4b, the intensity recorded in the intermediate image plane is plotted as a function of focal position. The graphical depiction of the recorded intensity may be compared to the depiction in FIG. 2b. The curve for the optimum focal position is once again depicted as a dashed line. It is clearly evident that the difference between the curve shape for the optimum focal position and the curves above and/or below the optimum focal position is not as clear as in FIG. 3b. The direction of motion of the center point—which is unequivocal and which, as already explained in FIG. 2b, runs from left to right—nevertheless allows an unequivocal statement. It is thus possible, similarly to the situation in FIG. 2b, to ascertain the optimum focal position unequivocally from the center point profile and the shape of the intensity peak.

Figure 5:
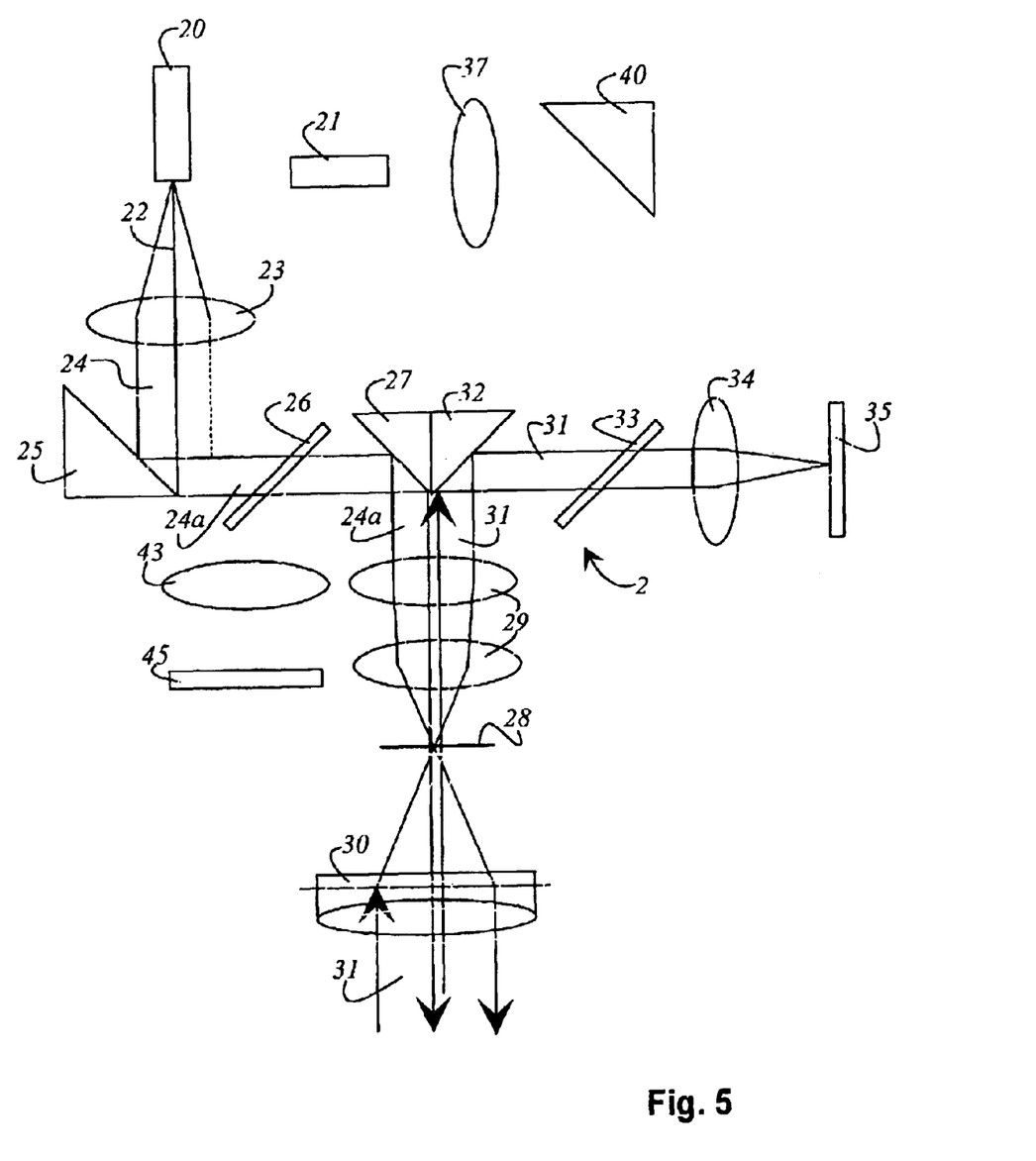
FIG. 5 schematically shows a configuration of the autofocus system according to the present invention with an alternating pupil splitting system, depicting the path of the focusing light beam emitted by the first laser.
Figure 6:
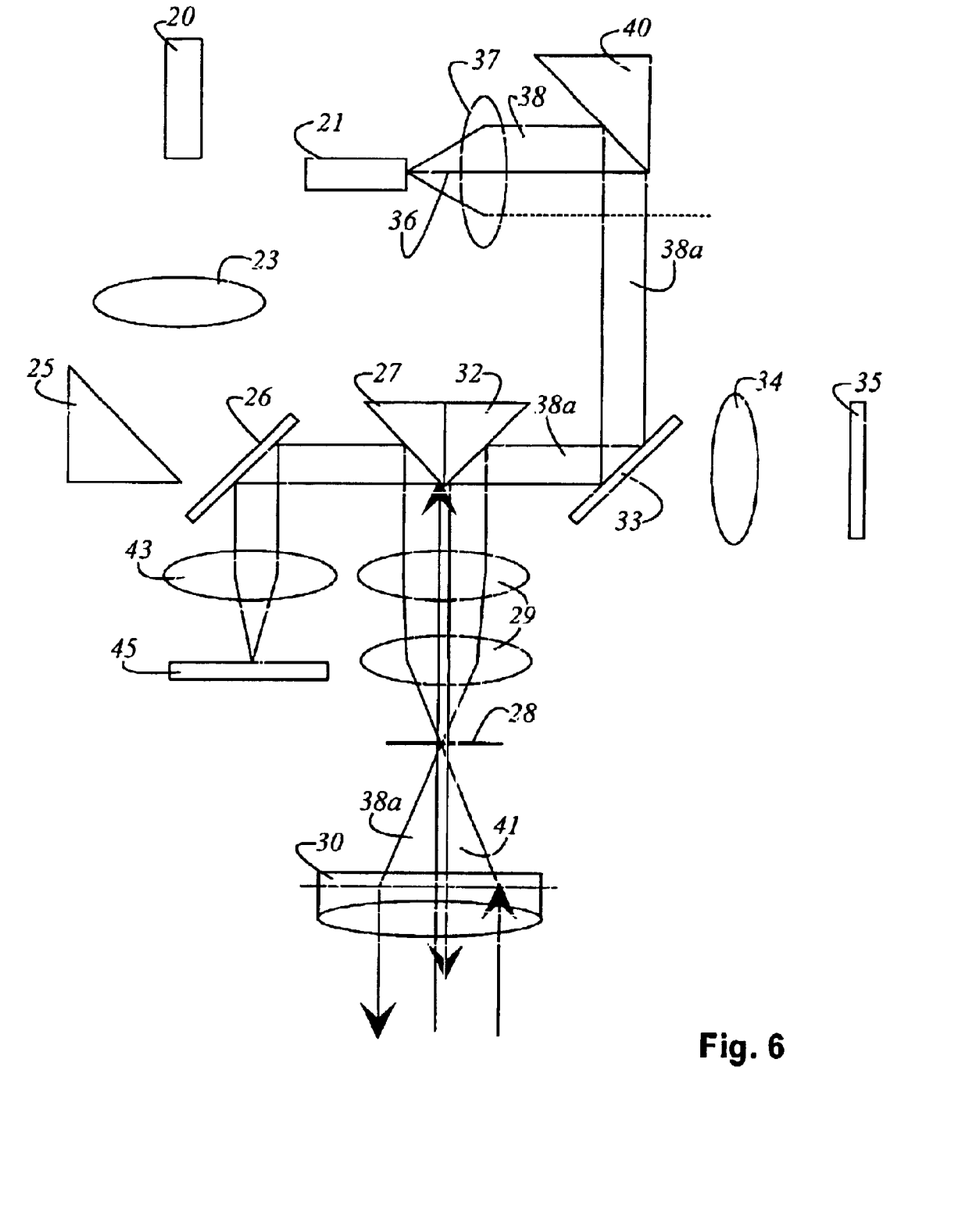
FIG. 6 schematically shows a configuration of the autofocus system according to the present invention with an alternating pupil splitting system, depicting the path of the focusing light emitted by the second laser.

The autofocus system according to the present invention is depicted schematically in FIG. 5 and FIG. 6. In contrast to the focus system depicted in FIG. 1a, here destination of the focal position is possible reliably and also irrespectively of the location of edges (transition from a high-reflectance region to a low-reflectance region) on specimen 4. Autofocus system 2 comprises a first and a second light source 20 and 21, both of which are, e.g., embodied as lasers. First and second light sources 20 and 21 are operated alternately at short time intervals during the relative motion between the specimen stage and objective. First and second light sources 20 and 21 thus transmit short flashes or pulses of light onto the surface of specimen 4. FIG. 5 depicts the situation in which first light source 20 is emitting its light flash as a divergent light beam 22 that is parallelized by an optical system 23. Parallel light beam 24 strikes an optical deflection means 25 in such a way that only one half 24a of the light beam is deflected, and the other half continues to propagate and is unused. Light beam half 24a continues to propagate in parallel fashion, passes uninfluenced through a first beam splitter 26, and strikes a second deflection means 27. Light beam 24a is imaged by an imaging optical system 29 onto an intermediate image plane 28, and from there the light beam is imaged by a further optical system 30 onto the surface of the specimen (not depicted). To eliminate undesirable reflected light, an aperture can additionally be provided in intermediate image plane 28. Parallel light beam 31 reflected from the specimen, after passing through further optical system 30 and imaging optical system 29, strikes a third deflection means 32. Reflected light beam 31 deflected by third deflection means 32 passes uninfluenced through a second beam splitter 33 and is imaged by an optical system 34 onto a first light-sensitive detector 35. First light-sensitive detector 35 can comprise, for example, a position-sensitive detector (PSD), a CCD array, or an area sensor having a defined number of sensor elements. In a preferred embodiment, first light-sensitive detector 35 is embodied as a PSD.

FIG. 6 depicts the situation in which second light source 21 is in operation, i.e., is emitting a light beam 36 as a light flash. As already mentioned above, first and second light sources 20 and 21 are operated in time-multiplexed fashion. Second light source 21 emits divergent light beam 36, which is parallelized by an optical system 37. Parallel light beam 38 strikes a fourth deflection means 40 in such a way that only one half 38a of the light beam is deflected, and the other half continues to propagate and is unused. From fourth deflection means 40, parallel light beam 38 strikes second beam splitter 33 and is directed by it onto third deflection means 32. Light beam 38a is imaged by imaging optical system 29 onto intermediate image plane 28, and from there light beam 38a is imaged by further optical system 30 onto the surface of the specimen (not depicted). Parallel light beam 41 reflected from the specimen, after passing through imaging optical system 30 and further optical system 29, strikes second deflection means 27. Light beam 41, reflected from the specimen and deflected by second deflection means 27, is directed by first beam splitter 26 onto an optical system 43 and imaged by the latter onto a second light-sensitive detector 45. This light-sensitive detector 45 is equipped in the same way as first light-sensitive detector 35. Second detector 45 is also embodied as a PSD.

Figure 7:
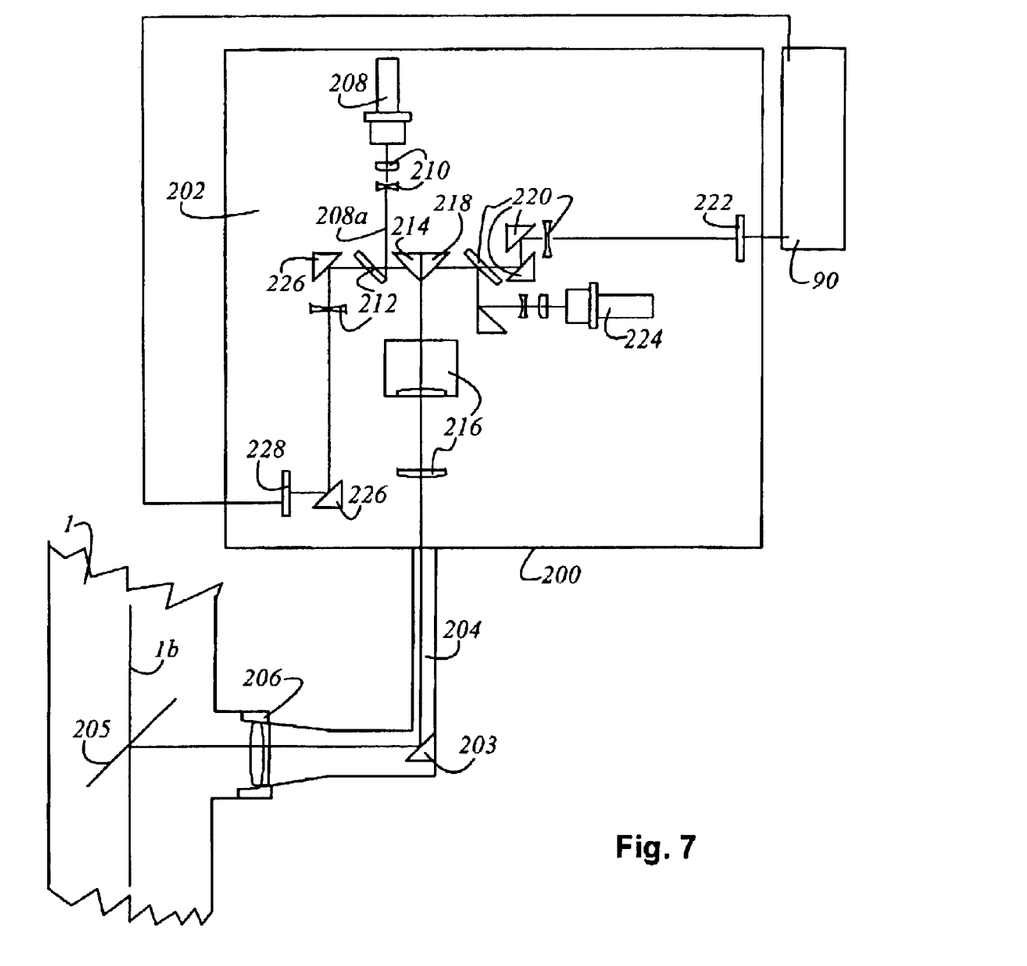
FIG. 7 shows an autofocus module, having the autofocus system of the invention, which can be attached to a microscope-based system.

FIG. 7 depicts an autofocus module 200 having the autofocus system of the invention, as depicted in FIGS. 5 and 6, that is attached to a microscope-based system 1 which is merely indicated here. Autofocus module 200 encompasses a housing 202 and a mounting element 204, joined to housing 202, that ends in a flange 206. Autofocus module 200 can be attached via flange 206 to microscope-based system 1. In the exemplary embodiment depicted here, a further deflection means 203 that deflects the measured light for incoupling is provided in mounting element 204. Incoupling without this deflection is also conceivable. Microscope-based system 1 defines a beam path $1b$. Provided in beam path $1b$ is a dichroic beam splitter 205 that couples the measured light for focus adjustment into and out of beam path $1b$ of microscope-based system 1. In housing 202 of autofocus module 200, the optical elements are immovably arranged and thus aligned with respect to one another. A first laser diode 208 generates a first focusing beam 208a that is directed, via an optical system 210 and a beam splitter 212, onto first deflection means 214; by way of further optical systems 216, focusing beam 208a travels to a deflection means that couples focusing beam 208a into microscope-based system 1. The incoupling of focusing light beam 208a is such that it is approximately exactly half of the illuminating light beam of microscope-based system 1. Focusing light beam 208a returning from the surface of the specimen strikes a second deflection means 218 and is directed via multiple optical means 220 onto a first detector 222. A second laser diode 224 generates a second focusing light beam 224a that is directed via the various optical means 220 onto second deflection means 218. Focusing beam 224a is coupled into microscope-based system 1 in a manner corresponding to that for first focusing beam 208a. Second focusing beam 224a returning from the specimen travels via further optical means 226 to a second detector 228.

Figure 8A:
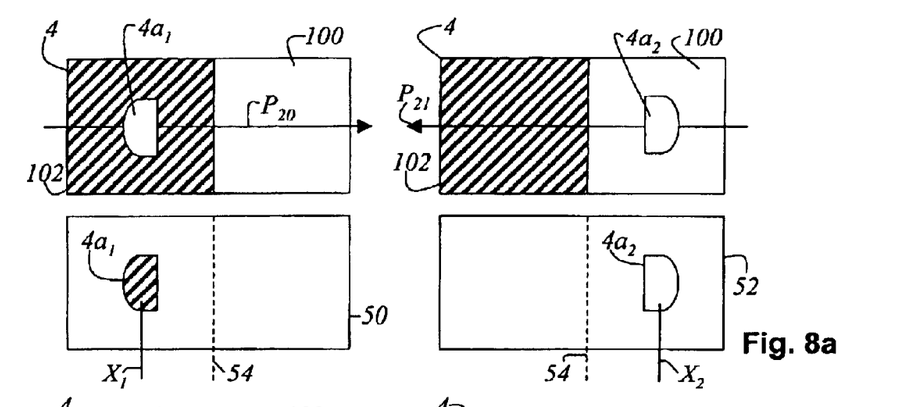
FIG. 8a shows the shape and motion of the focus spot on the surface of the specimen, and evaluation thereof by means of two PSDs.
Figure 8B:
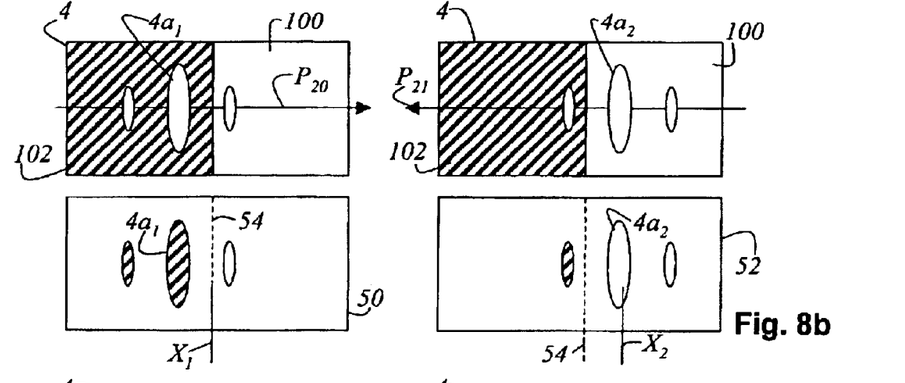
FIG. 8b shows the shape and motion of the focus spot close to the optimum focal position on the surface of the specimen, and evaluation thereof by means of two PSDs.
Figure 8C:
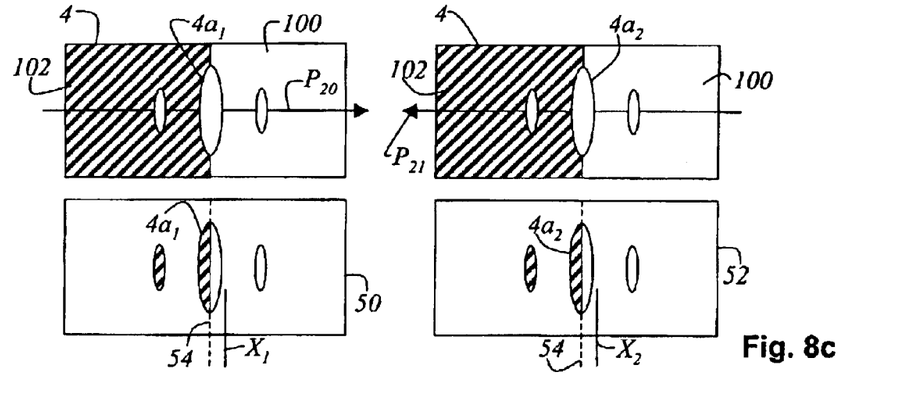
FIG. 8c shows the shape and motion of the focus spot at the optimum focal position on the surface of the specimen, and evaluation thereof by means of two PSDs.

FIGS. 8a through 8c show the shape and motion of the focus spot on the surface of specimen 4, and evaluation thereof by means of a first and a second PSD 50 and 52. With the apparatus described in FIG. 7, the images of a first and a second focus spot $4a_1$ and $4a_2$ are generated on the surface of specimen 4. In FIG. 8a, the upper part depicts the direction of travel of focus spots $4a_1$, $4a_2$ that results when illumination occurs alternately using first and second light sources 20 and 21. For illumination with first light source 20, the direction of travel of focus spot $4a_1$ is depicted by an arrow $P_{20}$. For illumination with second light source 21, the direction of travel of focus spot $4a_2$ is depicted by an arrow $P_{21}$. This labeling is also used in FIGS. 8b and 8c. In the situation depicted in FIG. 8a, the optimum focus position is still quite distant, and focus spots $4a_1$ and $4a_2$ are reproduced on the surface of specimen 4 as semicircles. Focus spots $4a_1$ and $4a_2$ are also correspondingly imaged onto first and second PSD 50 and 52. First focus spot $4a_1$ is imaged onto first PSD 50 at lower intensity, since it derives from reflection from a low-reflectance region of the surface of specimen 4. First PSD 50 determines position $X_1$ of the center point of first focus spot $4a_1$. Second PSD 52 determines position $X_2$ of the center point of second focus spot $4a_2$, which is generated by a high-reflectance region of the specimen. Position $X_1$ of the center point and position $X_2$ of the center point are at identical distances from centers 54 of first and second PSD 50 and 52. On first PSD 50, first focus spot $4a_1$ is located to the right of center 54. On second PSD 52, first focus spot $4a_2$ is located to the right of center 54. But because the intensity determined by the PSD is not the same, it is unequivocally clear that the optimum focus has not yet been achieved.

In FIG. 8b, the upper part depicts the direction of travel of focus spots $4a_1$ and $4a_2$ that results when illumination occurs alternately using first and second light source 20 and 21. In the situation depicted in FIG. 8b, the optimum focus position has almost been achieved and focus spot $4a_1$, $4a_2$ is constituted, as in FIG. 2a, by zero-order focus spot $9_0$, a negative-first-order focus spot $9_{-1}$, and a positive-first-order focus spot $9_{+1}$. Focus spots $4a_1$ and $4a_2$ are also correspondingly imaged onto first and second PSD 50 and 52, respectively. First focus spot $4a_1$ is imaged with less intensity on first PSD 50, because it derives mostly from reflection from a low-reflectance region of the surface of specimen 4; this is indicated by the cross-hatching of zero-order focus spot $9_0$ and negative-first-order focus spot $9_{-1}$. First PSD 50 determines position $X_1$ of the center point of first focus spot $4a_1$. Second PSD 52 determines position $X_2$ of the center point of second focus spot $4a_2$, which is generated mostly by a high-reflectance region of the specimen. Position $X_1$ of the center point and position $X_2$ of the center point are at different distances from centers 54 of first and second PSD 50 and 52, respectively. On first PSD 50, the center point of first focus spot $4a_1$ is located on center 54. On second PSD 52, the center point of second focus spot $4a_2$ is located to the right of center 54. Since the positions of the center points on first and second PSD 50 and 52 are not identical, the optimum focus has not yet been achieved.

In FIG. 8c, the upper part depicts the direction of travel of focus spots $4a_1$ and $4a_2$ that results when illumination occurs alternately using first and second light source 20 and 21. In the situation depicted in FIG. 8c, the optimum focal position has been achieved, and focus spot $4a_1$, $4a_2$ is constituted, as in FIG. 2a, by zero-order focus spot $9_0$, a negative-first-order focus spot $9_{-1}$, and a positive-first-order focus spot $9_{+1}$. Focus spots $4a_1$ and $4a_2$ are also correspondingly imaged onto first and second PSD 50 and 52, respectively. Focus spot $4a_1$ is imaged onto first PSD 50 in such a way that half of focus spot $4a_1$ derives from a low-reflectance region of the surface of specimen 4, and the other half of focus spot $4a_1$ derives from a high-reflectance region of the surface of specimen 4. The region of the focus spot on the PSD that results from low reflectance is marked with cross-hatching. First PSD 50 determines position $X_1$ of the center point of first focus spot $4a_1$. Second PSD 52 determines position $X_2$ of the center point of second focus spot $4a_2$. Position $X_1$ of the center point and position $X_2$ of the center point are at identical distances from center 54 of first and second PSD 50 and 52. Position $X_1$ of the center point and position $X_2$ of the center point are each shifted by the same amount to the right of center 54. The positions of the center points on first and second PSD 50 and 52 are quantitatively equal, so that with this measurement result from first and second PSD 50 and 52, the optimum focus has been achieved.

The invention has been described with reference to exemplary embodiments. It is self-evident, however, that changes and modifications can be made without thereby leaving the range of protection of the claims below.

| REFERENCE NUMERAL LIST | |
|---|---|
| 1 | Microscope-based system |
| 1a | Beam path |
| 1b | Dichroic beam splitter |
| 2 | Autofocus system |
| 4 | Specimen |
| 4a | Focus spot |
| $4a_1$ | First focus spot |
| $4a_2$ | Second focus spot |
| 5 | Dashed circle |
| 6 | Light source |
| 8 | Light beam |
| $9_0$ | Zero-order focus spot |
| $9_{-1}$ | Negative-first-order focus spot |
| $9_{+1}$ | Positive-first-order focus spot |
| 10 | Pupil splitting system |
| 11 | Beam splitter |
| 12 | Tube lens |
| 13 | Optical axis |
| 14 | Objective |
| 15 | Reflected light beam |
| 16 | Intermediate image plane |
| 17 | Abscissa |
| 18 | Ordinate |
| 20 | First light source |
| 21 | Second light source |
| 22 | Divergent light beam |
| 23 | Optical system |
| 24 | Parallel light beam |
| 24a | Light beam half |
| 25 | First deflection means |
| 26 | First beam splitter |
| 27 | Second deflection means |
| 28 | Intermediate image plane |
| 29 | Imaging optical system |
| 30 | Further optical system |
| 31 | Reflected light beam |
| 32 | Third deflection means |
| 33 | Second beam splitter |
| 34 | Optical system |
| 35 | Light-sensitive detector |
| 36 | Divergent light beam |
| 37 | Optical system |
| 38 | Light beam |
| 38a | Light beam half |
| 40 | Fourth deflection means |
| 41 | Parallel light beam |
| 43 | Optical system |
| 45 | Second light-sensitive detector |
| 49 | Pupil |
| 50 | First PSD |
| 52 | Second PSD |
| 54 | Center of PSD |
| 90 | Control computer |
| 100 | High-reflectance region |
| 102 | Low-reflectance region |
| 200 | Autofocus module |
| 202 | Housing |
| 203 | Deflection means |
| 204 | Mounting element |
| 205 | Dichroic beam splitter |
| 206 | Flange |
| 208 | First laser diode |
| 208a | First focusing beam |
| 210 | Optical system |
| 212 | Beam splitter |
| 214 | First deflection means |
| 216 | Further optical systems |
| 218 | Second deflection means |
| 220 | Multiple optical means |
| 222 | First detector |
| 224 | Second laser diode |
| 224a | Second focusing light beam |
| 226 | Further optical means |
| 228 | Second detector |
| P | Arrow |
| $P_{20}$ | Arrow |
| $P_{21}$ | Arrow |

| REFERENCE NUMERAL LIST | |
|---|---|
| X | X position |
| Z | Z direction |
| $X_1$ | Position of center point |
| $X_2$ | Position of center point |

What is claimed is:

1. An autofocus module for a microscope-based system, comprising:
a first light source configured to generate a first light beam for focusing;
a second light source configured for generating a second light beam for focusing;
an optical directing device configured to direct a respective portion of each of the first and second light beams onto an incoupling device, the incoupling device being configured to couple the respective portion of each of the first and second light beams into an illuminating light beam of the microscope-based system and direct the respective portion of each of the first and second light beams onto a specimen, the illuminating light beam being perpendicular to a surface of the specimen and propagating along an optical axis defined by an objective of the microscope-based system;
a first detector configured to receive a third light beam of only the first light source, the third light beam being reflected from the specimen; and
a second detector configured to receive a fourth light beam of only the second light source, the fourth light beam being reflected from the specimen.

2. The autofocus module as recited in claim 1 wherein the optical directing device includes a prism disposed so that the respective portion of the first light beam is directed into a first half of the illuminating light beam and the respective portion of the second light beam is directed into a second half of the illuminating light beam.

3. The autofocus module as recited in claim 1 wherein the optical directing device includes a first mirror-coated element configured to direct the respective portion of the first light beam and a second mirror-coated element configured to direct the respective portion of the second light beam, the first and second minor-coated elements being disposed at right angles to one another and inclined at a 45° angle to the incident respective portion of the first and second light beams.

4. The autofocus module as recited in claim 1 further including a beam deflection device, and wherein the first and the second light sources, the first and the second detectors, the optical directing device and the beam deflection device are disposed in a housing connectable to the microscope-based system.

5. The autofocus module as recited in claim 1 wherein each of the first and second light sources includes a respective laser diode.

6. The autofocus module as recited in claim 1 wherein the first and the second light sources, the first and the second detectors and the optical directing device are disposed in a housing connectable to the microscope-based system via a flange.

7. The autofocus module as recited in claim 1 wherein the microscope-based system includes a dichroic beam splitter configured to couple the first and second light beams into the microscope-based system and to couple the third and fourth light beams back into the autofocus module.

8. The autofocus module as recited in claim 1 wherein each of the first and the second detectors includes a respective matrix of photosensitive elements.

9. The autofocus module as recited in claim 1 wherein each of the first and second detectors includes a respective position-sensitive detector.

10. A microscope system comprising:
an objective defining an optical axis perpendicular to a surface of a specimen;
a stage configured to support the specimen and displaceable in a direction of the optical axis; and
an autofocus module including:
a first light source configured to generate a first light beam for focusing;
a second light source configured for generating a second light beam for focusing;
an optical directing device configured to direct a respective portion of each of the first and second light beams onto an incoupling device, the incoupling device being configured to couple the respective portion of each of the first and second light beams into an illuminating light beam of the microscope-based system and direct the respective portion of each of the first and second light beams onto the specimen, the illuminating light beam being perpendicular to a surface of the specimen and propagating along the optical axis;
a first detector configured to receive a third light beam of only the first light source, the third light beam being reflected from the specimen; and
a second detector configured to receive a fourth light beam of only the second light source, the fourth light beam being reflected from the specimen.

11. The microscope system as recited in claim 10 further comprising a dichroic beam splitter mounted in an autofocus module mounting element of the microscope system and configured to couple the first and second light beams into the microscope-based system and to couple the third and fourth light beams back into the autofocus module.

12. The microscope system as recited in claim 10 wherein the optical directing device includes a prism disposed so that the respective portion of the first light beam is directed into a first half of the illuminating light beam and the respective portion of the second light beam is directed into a second half of the illuminating light beam.

13. The microscope system as recited in claim 10 wherein the optical directing device includes a first mirror-coated element configured to direct the respective portion of the first light beam and a second mirror-coated element configured to direct the respective portion of the second light beam, the first and second mirror-coated elements being disposed at right angles to one another and inclined at a 45° angle to the incident respective portion of the first and second light beams.

14. The microscope system as recited in claim 10 wherein each of the first and second light sources includes a respective laser diode.

15. The microscope system as recited in claim 10 wherein each of the first and the second detectors includes a respective matrix of photosensitive elements.

16. The microscope system as recited in claim 10 wherein each of the first and second detectors includes a respective position-sensitive detector.

17. A method for autofocusing a microscope-based system, the microscope-based system including at least one objective defining an optical axis of the microscope-based system, the method comprising:

displacing a specimen in a direction of the optical axis and in a vicinity of a region that includes an optimum focal position;
alternatingly generating a first light beam using a first light source and a second light beam using a second light source;
directing a respective portion of each of the first and second light beams onto a surface of the specimen using an optical directing device;
receiving on a first detector light of only the first light source reflected from the surface of the specimen;
receiving on a second detector light of only the second light source reflected from the surface of the specimen; and
determining the optimum focal position using intensities measured on the first and second detectors.

18. The method as recited in claim 17 further comprising:
alternately determining a respective intensity at the first and second detectors during the displacing of the specimen so as to determine the measured intensities; and
storing the measured intensities as intensity profiles in a memory of a control computer.

19. The method as recited in claim 18 wherein the determining the optimal focal position is performed by determining the measured intensities or intensity profiles that come closest to a criteria for the optimum focal position.

20. The method as recited in claim 17 wherein the optical directing device includes a prism, and wherein the directing is performed, using the prism, so that the respective portion of the first light beam is directed into a first half of an illuminating light beam and the respective portion of the second light beam is directed into a second half of an illuminating light beam.

21. The method as recited in claim 20 wherein the optical directing device includes a first minor-coated element configured to direct the respective portion of the first light beam and a second mirror-coated element configured to direct the respective portion of the second light beam, the first and second mirror-coated elements being disposed at right angles to one another and inclined at a 45° angle to the incident respective portion of the first and second light beams.

22. The method as recited in claim 20 further comprising disposing a beam deflection device, the first and the second light sources, the first and the second detectors and the optical directing device in a housing connectable to the microscope-based system.

23. The method as recited in claim 22 wherein the microscope-based system includes a dichroic beam splitter configured to couple the first and second light beams into the microscope-based system and to couple the third and fourth light beams back into the autofocus module.

24. The method as recited in claim 17 wherein each of the first and second light sources includes a respective laser diode.

25. The method as recited in claim 17 wherein each of the first and the second detectors includes a respective matrix of photosensitive elements.

26. The method as recited in claim 17 wherein each of the first and second detectors includes a respective position-sensitive detector.

* * * * *